US008839973B2

(12) United States Patent
Wu (10) Patent No.: US 8,839,973 B2
(45) Date of Patent: Sep. 23, 2014

(54) FUEL INLET DEVICE WITH A CAP MEMBER FOR A FUEL TANK

(71) Applicant: Coplus Inc., Tainan (TW)

(72) Inventor: Jacob Wu, Tainan (TW)

(73) Assignee: Coplus, Inc., Tainan (TW)

( * ) Notice: Subject to any disclaimer, the term of this patent is extended or adjusted under 35 U.S.C. 154(b) by 86 days.

(21) Appl. No.: 13/621,622

(22) Filed: Sep. 17, 2012

(65) Prior Publication Data

US 2014/0014660 A1 Jan. 16, 2014

(30) Foreign Application Priority Data

Jul. 10, 2012 (TW) .............................. 101124756 A (51) Int. Cl.
*B65B 3/00* (2006.01)
*B65D 45/00* (2006.01)
*B65D 41/04* (2006.01)
*B65D 43/26* (2006.01)

(52) U.S. Cl.
USPC ................. 220/86.2; 220/86.1; 220/DIG. 33; 220/315; 220/300; 220/298; 220/297; 220/293; 220/288

(58) Field of Classification Search
CPC . B60K 15/0406; B60K 15/0409; B65D 39/10
USPC ........ 220/86.2, 86.1, DIG. 33, 315, 301, 300, 220/298, 297, 293, 288
See application file for complete search history.

(56) References Cited

U.S. PATENT DOCUMENTS

| | | | |
|---|---|---|---|
| 3,477,611 A * | 11/1969 | Niles ............................. 220/86.2 |
| 4,333,580 A * | 6/1982 | Sweigart, Jr. ................. 220/4.13 |
| 6,942,255 B2 * | 9/2005 | Pickering .................... 285/136.1 |

* cited by examiner

*Primary Examiner* — Fenn Mathew
*Assistant Examiner* — Don M Anderson
(74) *Attorney, Agent, or Firm* — Christie, Parker & Hale, LLP (57) ABSTRACT

A fuel inlet device for a fuel tank includes a cap member connected detachably to a fuel inlet port, which includes a tube body. When a plug body of the cap member is inserted into the tube body through an upper central opening defined by an inner annular wall, a notch in the inner annular wall permits a protrusion unit having first and second abutting blocks and formed on the plug body to pass therethrough such that the cap member is rotatable relative to the tube body between an open position, where the second abutting block of the cap member abuts a curved inner wall defining the notch, and a closed position, where the cap member is connected tightly with the fuel inlet port.

11 Claims, 9 Drawing Sheets

FUEL INLET DEVICE WITH A CAP MEMBER FOR A FUEL TANK

CROSS-REFERENCE TO RELATED APPLICATION

This application claims priority to Taiwanese Application No. 101124756, filed on Jul. 10, 2012.

BACKGROUND OF THE INVENTION

1. Field of the Invention

The invention relates to a fuel inlet device, and more particularly to a fuel inlet device with a cap member for a fuel tank.

2. Description of the Related Art

Figure 1:
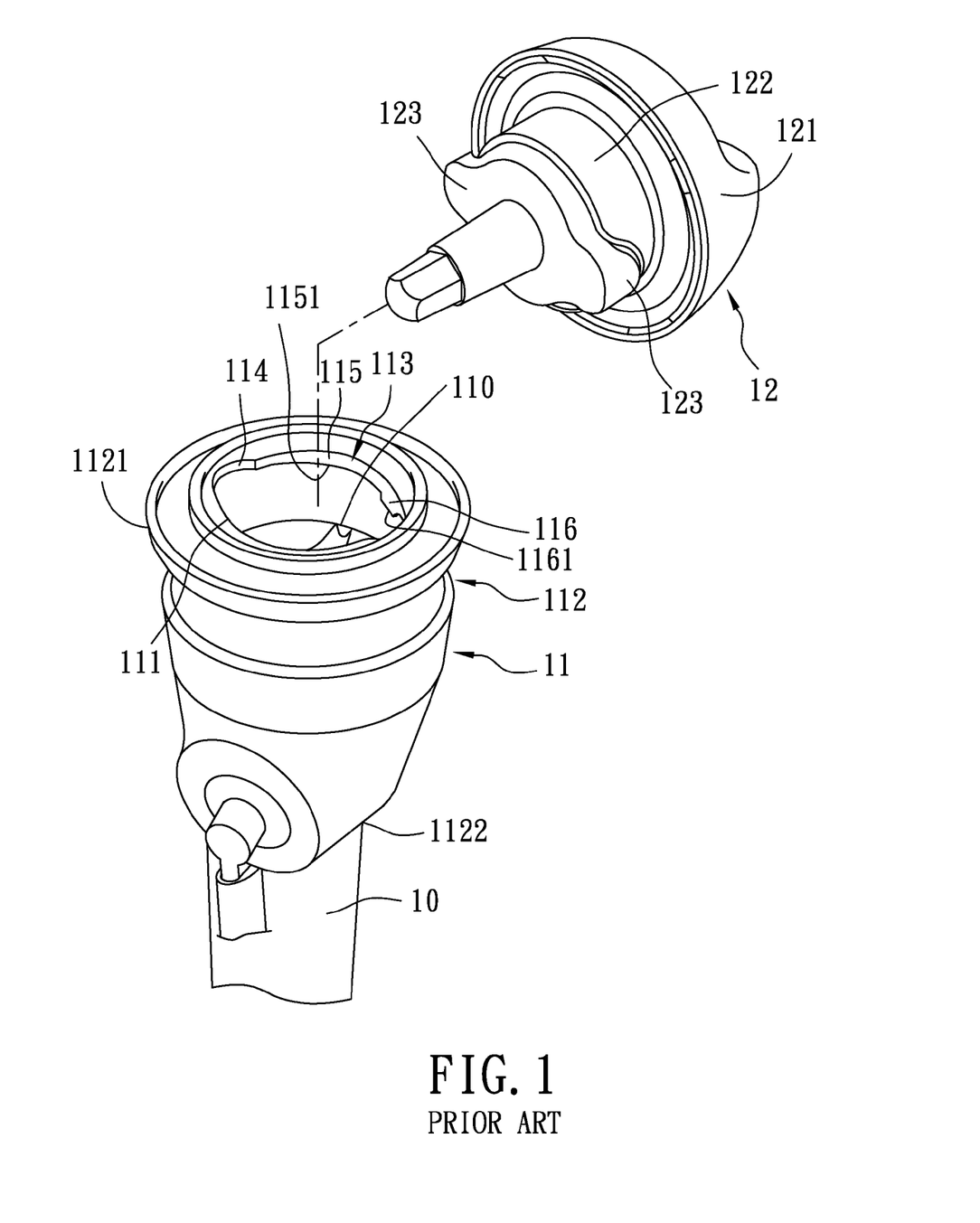
FIG. 1 is an exploded perspective view showing a conventional fuel inlet device for a fuel tank.
Figure 2:
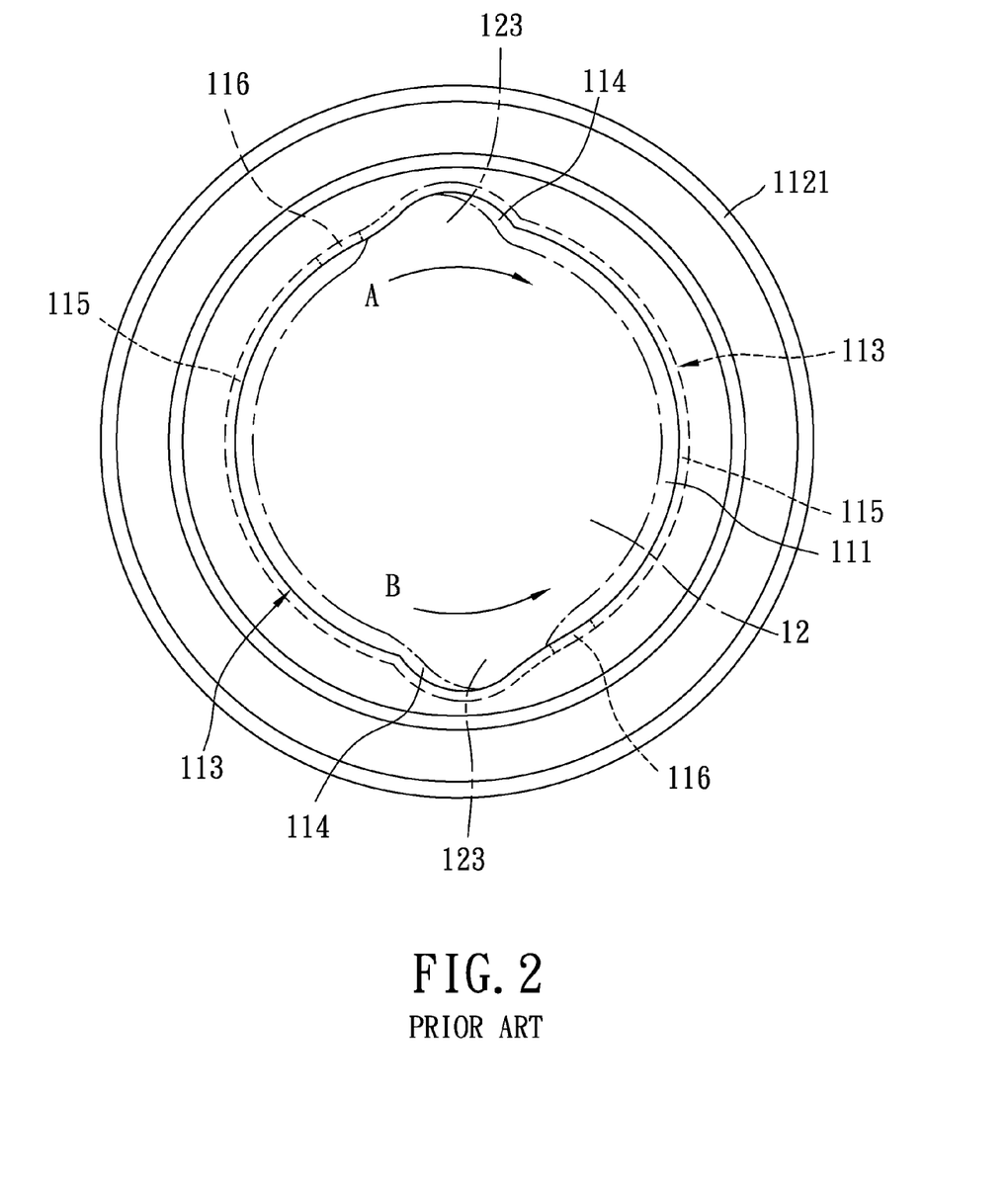
FIG. 2 is a schematic top view illustrating the relationship between a fuel inlet port and a cap member of the conventional fuel inlet device.

Referring to FIGS. 1 and 2, a conventional fuel inlet device for a fuel tank in a vehicle (not shown) is shown to include a fuel inlet port 11 attached to the fuel tank through a fuel tube 10, and a cap member 12 adapted to be connected detachably to the fuel inlet port 11.

The fuel inlet port 11 is mounted to the vehicle, and includes a tube body 112 that defines therein a fuel-filling channel 110 in spatial communication with the fuel tube 10. The tube body 112 has an upper cap-mounting end 1121 formed with a circular central opening 111, and a lower connecting end 1122 connected to the fuel tube 10. The central opening 111 is defined by an inner annular wall 113 that is formed with two notches 114 opposite to each other in a radial direction of the tube body 112 (see FIG. 2) and in spatial communication with the opening 111 and the fuel-filling channel 110. The inner annular wall 113 has two abutting wall sections 115, each of which is disposed adjacent to a corresponding one of the notches 114, and two blocking wall sections 116, each of which is connected to a corresponding one of the abutting wall sections 115. Each of the abutting wall sections 115 has a bottom edge 1151 that extends gradually and downwardly toward a corresponding one of the blocking wall sections 116 connected therewith. Each of the blocking wall sections 116 has a downward projecting lower extension 1161.

The cap member 12 is adapted to be connected detachably to the fuel inlet port 11 to seal the fuel-filling channel 110. The cap member 12 includes an enlarged head portion 121, and a plug portion 122 connected to the head portion 121. The plug portion 122 has two radially extending semicircular protrusions 123 corresponding respectively to the notches 114 in the cap-mounting end 1121 of the tube body 112.

When the plug portion 122 is inserted into the fuel-filling channel 110 in the tube body 112 through the opening 111 in the cap-mounting end 1121 of the tube body 112, each of the notches 114 permits a corresponding one of the protrusions 123 to pass therethrough. In this case, the cap member 12 is at an open position. Thereafter, by operating the head portion 121 of the cap member 12, the cap member 12 is rotated relative to the fuel inlet port 11 in a first direction (A) to move from the open position to a closed position. During movement of the cap member 12 from the open position to the closed position, each of the protrusions 123 of the plug portion 122 of the cap member 12 abuts movably against and is guided by the bottom edge 1151 of a corresponding one of the abutting wall sections 115 of the inner annular wall 113 so as to move toward a corresponding one of the blocking wall sections 116 of the inner annular wall 113 such that the cap member 12 is connected tightly with the fuel inlet port 11, thereby sealing the fuel-filling channel 110. When the cap member 12 is at the closed position, each of the protrusions 123 of the plug portion 122 of the cap member 12 is blocked by the lower extension 1161 of the corresponding one of the blocking wall sections 116 of the inner annular wall 13. On the contrary, when the cap member 12 is rotated relative to the fuel inlet port 11 in a second direction (B) (see FIG. 2) opposite to the first direction (A) to move from the closed position to the open position, the cap member 12 can be detached from the fuel inlet port 11.

However, when the cap member 12 is moved to the closed position, the cap member 12 cannot be retained at the closed position due to lack of a positioning mechanism between the protrusion 123 and the abutting wall section 115. As a result, the cap member 12 may move away from the closed position in response to vibration of the vehicle such that tight connection between the fuel inlet port 11 and the cap member 12 cannot be ensured. On the other hand, when the cap member 12 is rotated in the second direction (B) from the closed position toward the open position to detach the cap member 12 from the fuel inlet port 11, excessive rotation of the cap member in the second direction (B) may occur, thereby resulting in misalignment of each of the protrusions 123 with the corresponding one of the notches 114, as shown in FIG. 2. Therefore, in order to detach the cap member 12 from the fuel inlet port 11, it is required to slightly rotate the cap member 12 in the first direction (A) again to align each of the protrusions 123 with the corresponding one of the notches 114, thereby resulting in inconvenience during detachment of the cap member 12.

SUMMARY OF THE INVENTION

Therefore, an object of the present invention is to provide a fuel inlet device with a cap member for a fuel tank that can overcome the aforesaid drawbacks of the prior art.

According to one aspect of the present invention, there is provided a fuel inlet device for a fuel tank. The fuel inlet device of this invention comprises a fuel inlet port and a cap member.

The fuel inlet port is adapted to be attached to the fuel tank through a fuel tube. The fuel inlet port includes a tube body that defines therein a fuel-filling channel in spatial communication with the fuel tube. The tube body has an upper cap-mounting end, and a lower connecting end adapted to be connected to the fuel tube. The upper cap-mounting end of the tube body is formed with a central opening in spatial communication with the fuel-filling channel and defined by an inner annular wall. The inner annular wall has a depression section, and is formed with at least one notch that is in communication with the central opening and the fuel-filling channel and that is defined by the depression section. The inner annular wall further has an abutting wall section disposed adjacent to the notch. The depression section has an end portion that extends downward into the fuel-filling channel and that is distal from the abutting wall section of the inner annular wall.

The cap member is adapted to be connected detachably to the fuel inlet port to seal the fuel-filling channel in the tube body of the fuel inlet port. The cap member includes a plug body and at least one protrusion unit. The plug body extends in a longitudinal direction, and is capable of being inserted into the fuel-filling channel in the tube body of the fuel inlet port through the central opening in the upper cap-mounting end of the tube body of the fuel inlet port. The protrusion unit projects outwardly and radially from the plug body such that the notch in the upper cap-mounting end of the tube body of the fuel inlet port permits the protrusion unit to pass therethrough so as to enter the fuel-filling channel in the tube body when the plug body of the cap member is inserted into the fuel-filling channel in the tube body. The protrusion unit has a first abutting block and a second abutting block.

When the plug body and the protrusion unit of the cap member are inserted into the fuel-filling channel in the tube body of the fuel inlet port, the cap member is rotatable relative to the tube body of the fluid inlet port between an open position, where the cap member is capable of being detached from the fluid inlet port, and a closed position, where the cap member is tightly connected with the fuel inlet port.

When the cap member is at the open position, the second abutting block of the protrusion unit abuts against the end portion of the depression section of the inner annular wall of the tube body.

When the cap member is moved from the open position to the closed position, the first abutting block of the protrusion unit abuts movably against a bottom end of the abutting wall section of the inner annular wall of the tube body.

According to another aspect of the present invention, there is provided a cap member for a fuel inlet port attached to a fuel tank. The fuel inlet port includes a tube body defining a fuel-filling channel therein. The tube body has an upper cap-mounting end, and a lower connecting end connected to the fuel tank. The upper cap-mounting end of the tube body is formed with a central opening in spatial communication with the fuel-filling channel and defined by an inner annular wall. The inner annular wall has a depression section and is formed with at least one notch in communication with the central opening and the fuel-filling channel and defined by the depression section. The inner annular wall further has an abutting wall section disposed adjacent to the notch. The depression section has an end portion that extends downward into the fuel-filling channel and that is distal from the abutting wall section of the inner annular wall. The cap member is adapted to be connected detachably to the fuel inlet port to seal the fuel-filling channel in the tube body of the fuel inlet port. The cap member comprises a plug body and at least one protrusion unit.

The plug body extends in a longitudinal direction, and is adapted to be inserted into the fuel-filling channel in the tube body.

The protrusion unit projects outwardly and radially from the plug body and is configured to pass through the notch in the upper cap-mounting end of the tube body of the fuel inlet port so as to enter the fuel-filling channel in the tube body when the plug body is inserted into the fuel-filling channel in the tube body. The protrusion unit has a first abutting block and a second abutting block.

When the plug body and the protrusion unit of the cap member are inserted into the fuel-filling channel in the tube body of the fuel inlet port, the cap member is rotatable relative to the tube body of the fluid inlet port between an open position, where the cap member is capable of being detached from the fluid inlet port, and a closed position, where the cap member is tightly connected with the fuel inlet port.

When the cap member is at the open position, the second abutting block of the protrusion unit is adapted to abut against the end portion of the depression section of the inner annular wall of the tube body.

When the cap member is moved from the open position to the closed position, the first abutting block of the protrusion unit is adapted to abut movably against a bottom end of the abutting wall section of the inner annular wall of the tube body.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 3:
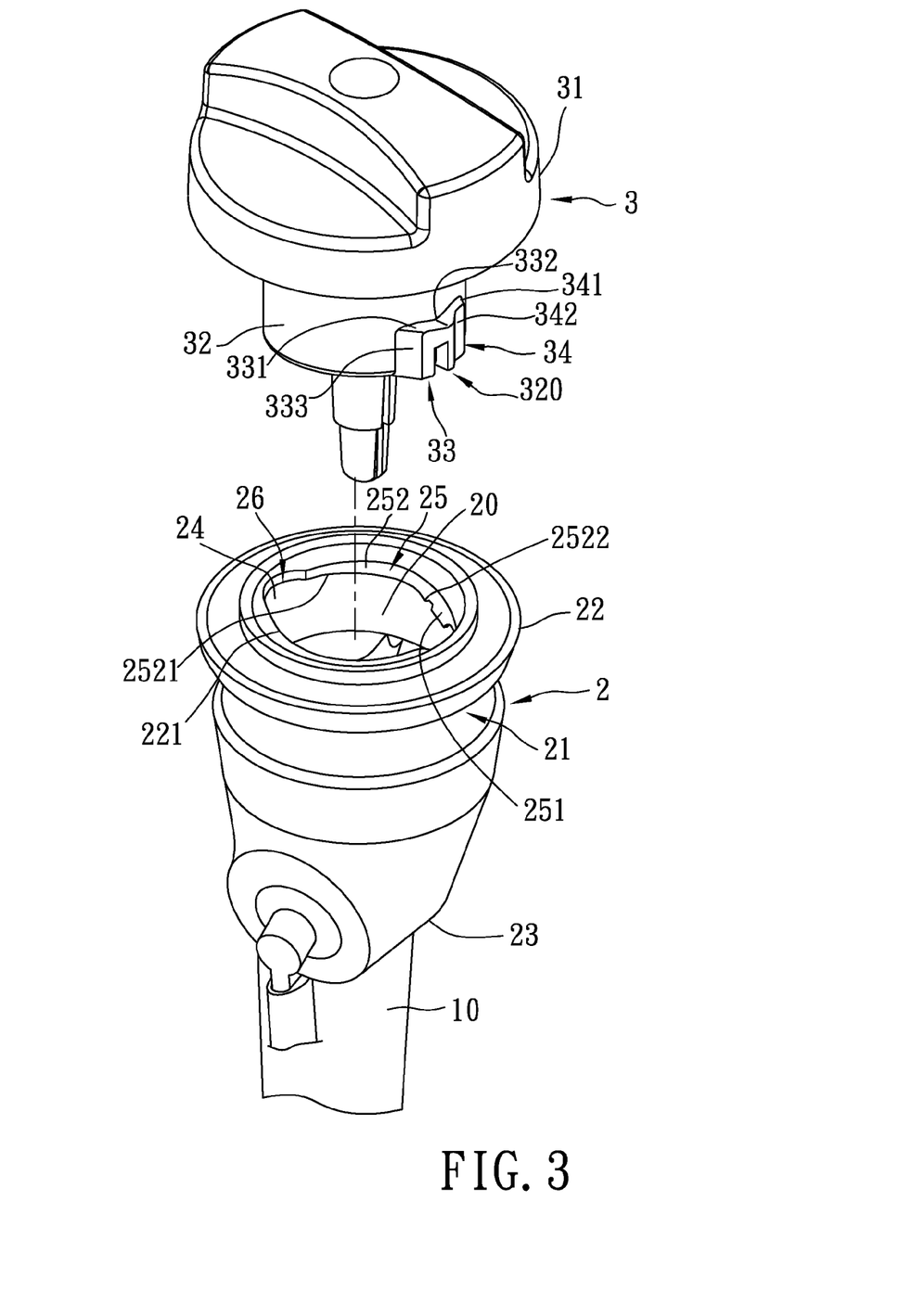
FIG. 3 is an exploded perspective view showing the first preferred embodiment of a fuel inlet device according to the present invention.
Figure 4:
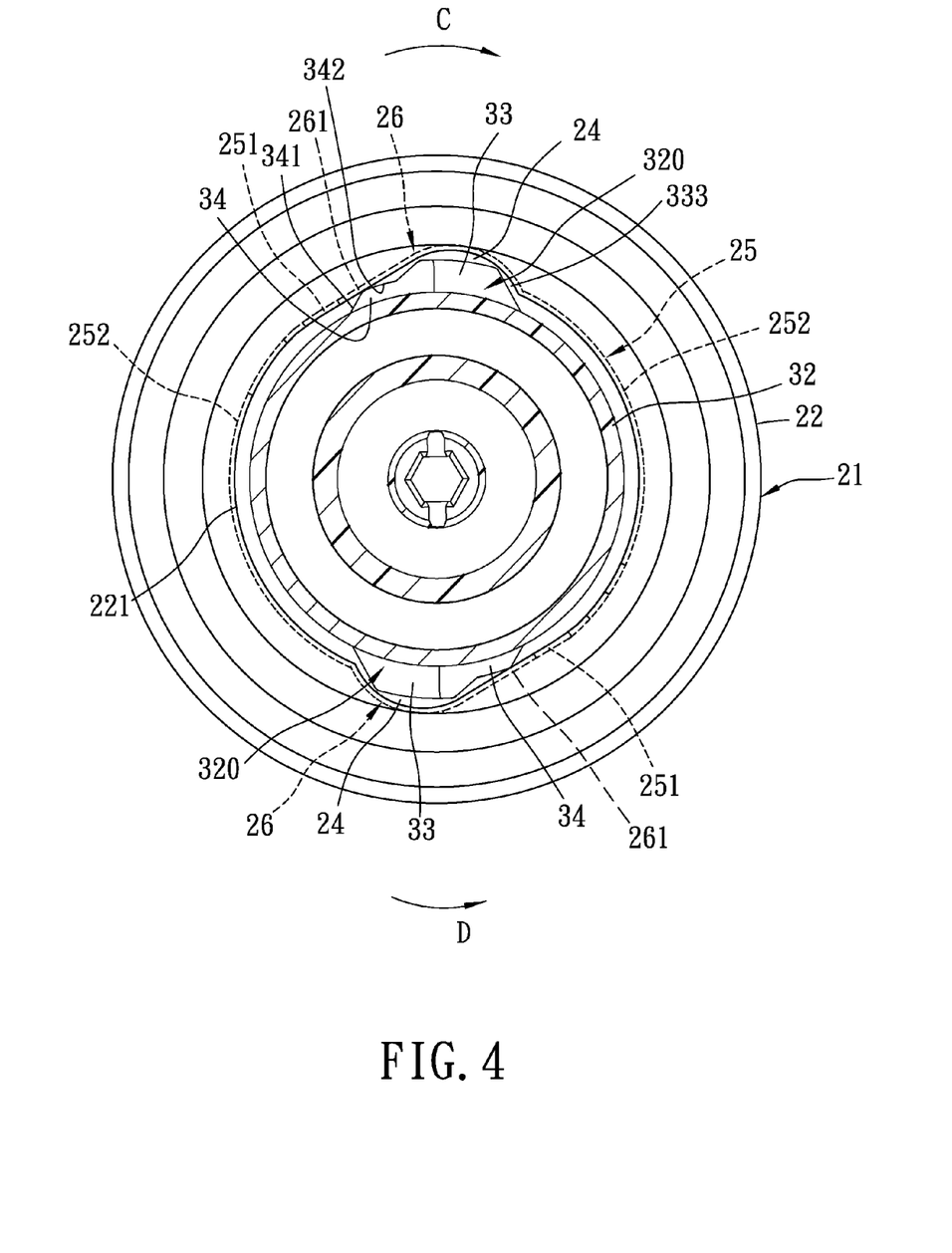
FIG. 4 is a schematic sectional top view showing the first preferred embodiment when a cap member is at an open position.

Referring to FIGS. 3 and 4, the first preferred embodiment of a fuel inlet device for a fuel tank (not shown) according to the present invention is shown to include a fuel inlet port 2 and a cap member 3.

Figure 5:
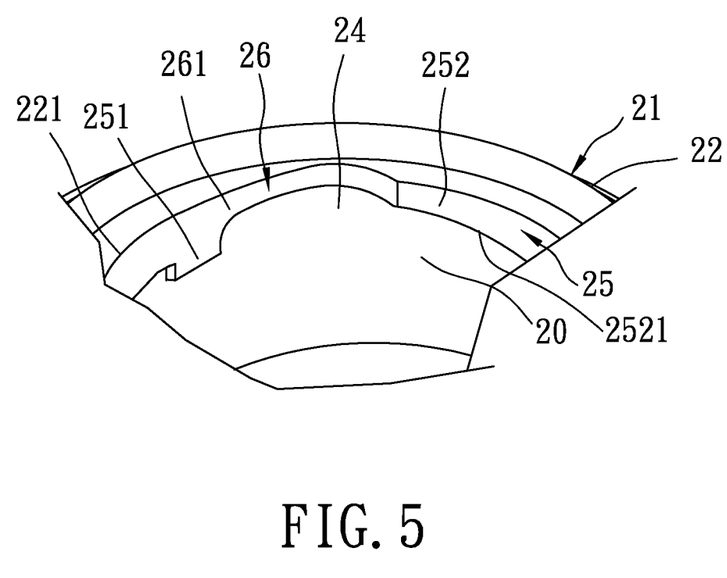
FIG. 5 is a fragmentary perspective view showing a tube body of a fuel inlet port of the first preferred embodiment.
Figure 7:
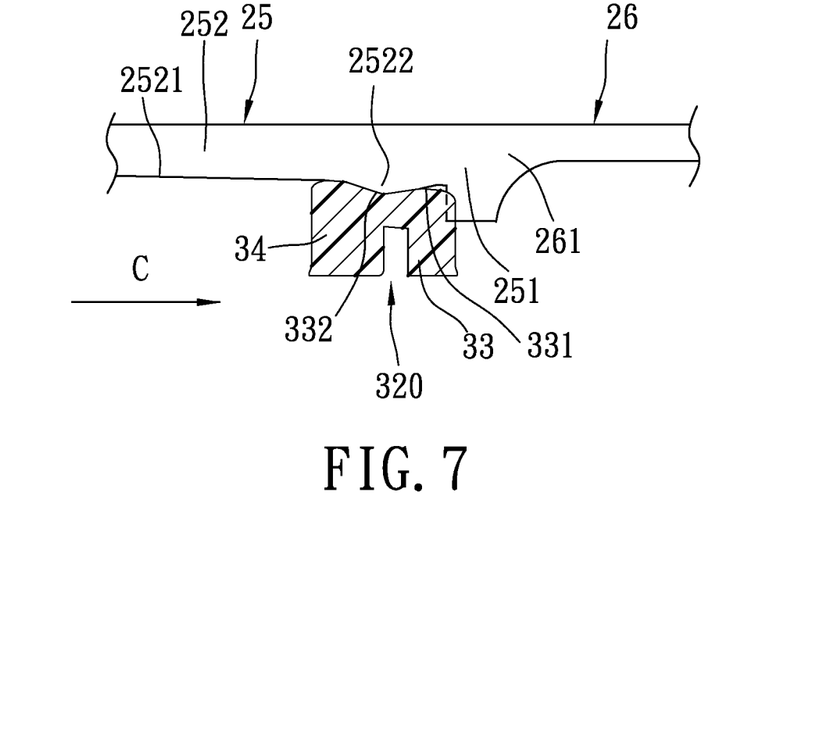
FIG. 7 is a stretched fragmentary schematic sectional view illustrating the relationship between a protrusion unit of the cap member and an inner annular wall of the tube body when the cap member of the first preferred embodiment is at a closed position.
Figure 8:
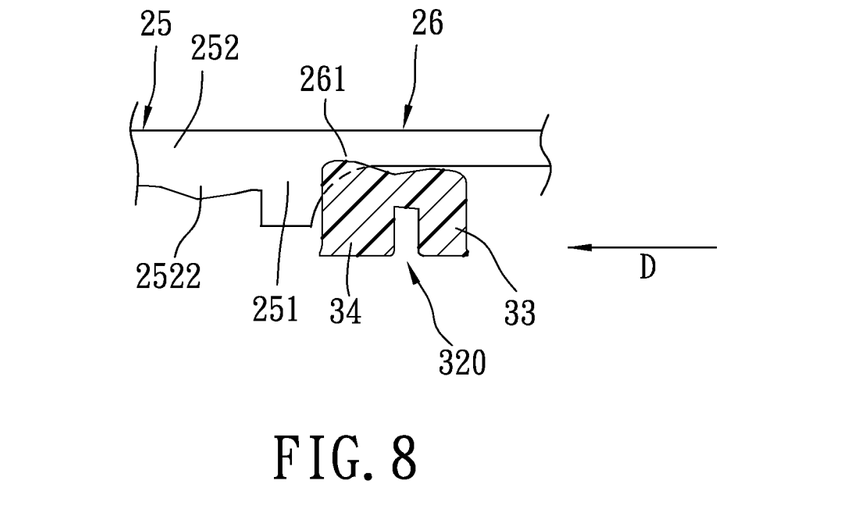
FIG. 8 is a stretched fragmentary schematic sectional view illustrating the relationship between the protrusion unit of the cap member and the inner annular wall of the tube body when the cap member of the first preferred embodiment is at the open position.

The fuel inlet port 2 is adapted to be attached to the fuel tank through a fuel tube 10. The fuel inlet port 2 includes a tube body 21 that defines therein a fuel-filling channel 20 in spatial communication with the fuel tube 10. The tube body 21 has an upper cap-mounting end 22, and a lower connecting end 23 adapted to be connected to the fuel tube 10. The upper cap-mounting end 22 of the tube body 21 is formed with a central opening 221 in spatial communication with the fuel-filling channel 20 and defined by an inner annular wall 25. The inner annular wall 25 has two depression sections 26, and is formed with two notches 24 opposite to each other in a radial direction of the tube body 21, as best shown in FIG. 4. Each of the notches 24 is in communication with the central opening 221 and the fuel-filling channel 20, and is defined by a corresponding one of the depression sections 26, as best shown in FIG. 5. The inner annular wall 25 further has two spaced apart abutting wall sections 252, each of which is disposed adjacent to a corresponding one of the notches 24, and two spaced apart stop wall sections 251, each of which extends downward into the fuel-filling channel 20, is connected to a corresponding one of the abutting wall sections 252 and is distal from the corresponding one of the notches 24, as shown in FIG. 4. Each of the abutting wall sections 252 has a bottom end which has an inclined abutting edge 2521 extending downward and gradually toward a corresponding one of the stop wall sections 251, and a downward extending engaging protrusion 2522 disposed between the inclined abutting edge 2521 and the corresponding one of the stop wall sections 251, as shown in FIGS. 7 and 8. Each of the depression sections 26 has an end portion 261 that extends downward into the fuel-filling channel 20 and that is distal from the corresponding one of the abutting wall sections 252.

Figure 6:
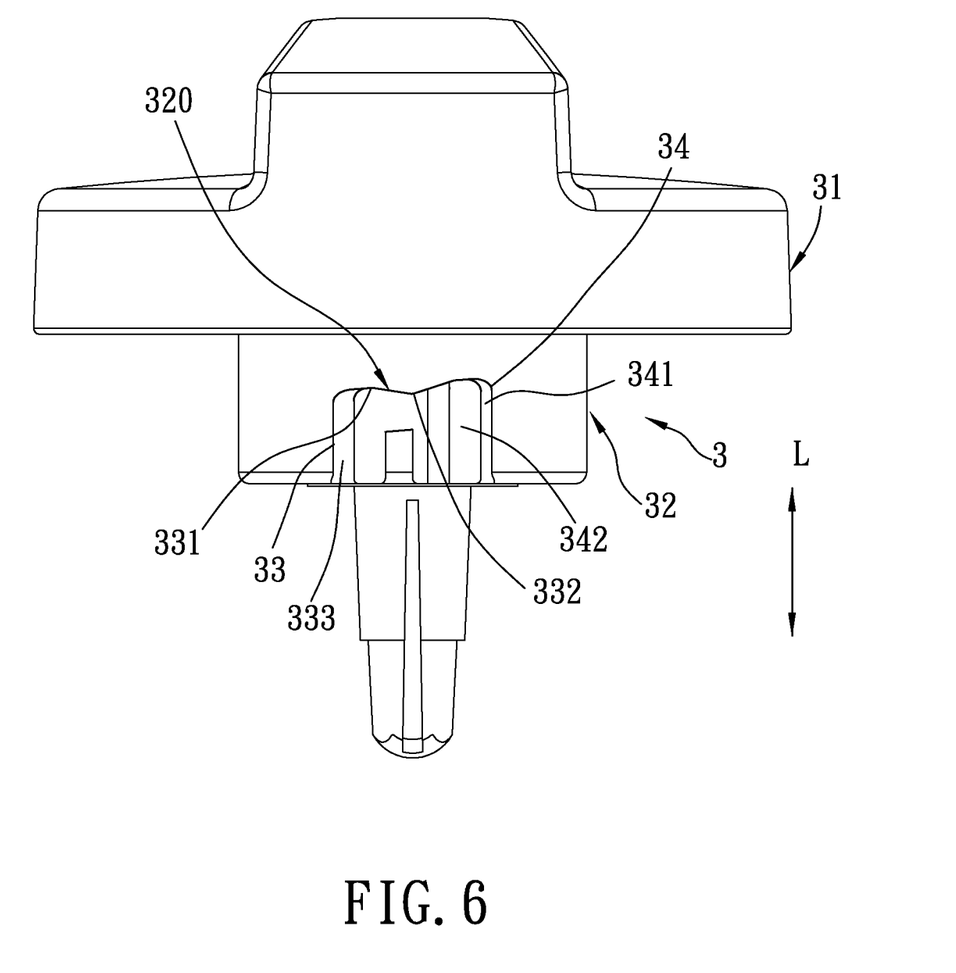
FIG. 6 is a schematic side view showing a cap member of the first preferred embodiment.

Referring further to FIG. 6, the cap member 3 is adapted to be connected detachably to the fuel inlet port 2 to seal the fuel-filling channel 20 in the tube body 21 of the fuel inlet port 2. The cap member 3 includes an enlarged head portion 31, a plug body 32, and two protrusion units 320. When the cap member is connected to the fuel inlet port 2, the head portion 31 is disposed on the upper cap-mounting end 22 of the tube body 21 to cover the notches 24 and the central opening 221. The head portion 31 is adapted to be operated by a user to rotate the cap member 3. The plug body 32 is connected to the head portion 31, and extends in a longitudinal direction (L) (see FIG. 6). The plug body 32 is capable of being inserted into the fuel-filling channel 20 in the tube body 21 of the fuel inlet port 2 through the central opening 221 in the upper cap-mounting end 22 of the tube body 21. The protrusion units 320 project outwardly and radially from the plug body 32, and correspond respectively to the notches 24 such that each of the notches 24 in the upper cap-mounting end 221 of the tube body 21 of the fuel inlet port 2 permits a corresponding one of the protrusion units 320 to pass therethrough so as to enter the fuel-filling channel 20 in the tube body 21 when the plug body 32 of the cap member 3 is inserted into the fuel-filling channel 20 in the tube body 21. Each of the protrusion units 320 has a first abutting block 33 and a second abutting block 34. When the plug body 32 and the protrusion units 320 of the cap member 3 are inserted into the fuel-filling channel 20 in the tube body 21, by operating the enlarged head portion 31, the cap member 3 is rotatable relative to the tube body 21 of the fluid inlet port 2 between an open position, where the cap member 3 is capable of being detached from the fluid inlet port 2, and a closed position, where the cap member 3 is tightly connected with the fuel inlet port 2.

In this embodiment, the first and second abutting blocks 33, 34 of each of the protrusion units 320 are integrally connected to each other. For each of the protrusion units 320, the first abutting block 33 is greater than the second abutting block 34 in a radial direction (see FIG. 4), and is less than the second abutting block 34 in the longitudinal direction (L) (see FIG. 6). In addition, for each of the protrusion units 320, the first abutting block 33 has an abutting top face 331 formed with an engaging groove 332 (as best shown in FIGS. 7 and 8), and a lateral side 333 distal from the second abutting block 34. The second abutting block 34 has an abutting face 342, and a guiding lateral side 341 connected to the abutting face 342 and distal from the first abutting block 33, as best shown in FIG. 4.

Accordingly, when the cap member 3 is at the open position, the abutting face 342 of the second abutting block 34 abuts against the end portion 261 of a corresponding one of the depression sections 26 of the tube body 21 of the fuel inlet port 2 (see FIG. 4). When the cap member 33 is moved away from the open position, the abutting face 342 of the second abutting block 34 faces a corresponding one of the abutting wall sections 252 of the inner annular wall 25. When the cap member 33 is rotated in a first direction (C) to move from the open position toward the closed position, the abutting top face 331 of the first abutting block 33 of each of the protrusion units 320 abuts movably against the inclined abutting edge 2521 of the bottom end of the corresponding one of the abutting wall sections 252.

When the cap member 33 is moved to the closed position, the engaging groove 332 in the first abutting block 33 of each of the protrusion units 320 engages the engaging protrusion 2522 of the bottom end of the corresponding one of the abutting wall sections 252 of the inner annular wall 25, as best shown in FIG. 7, thereby retaining the cap member 3 at the closed position.

Figure 9:
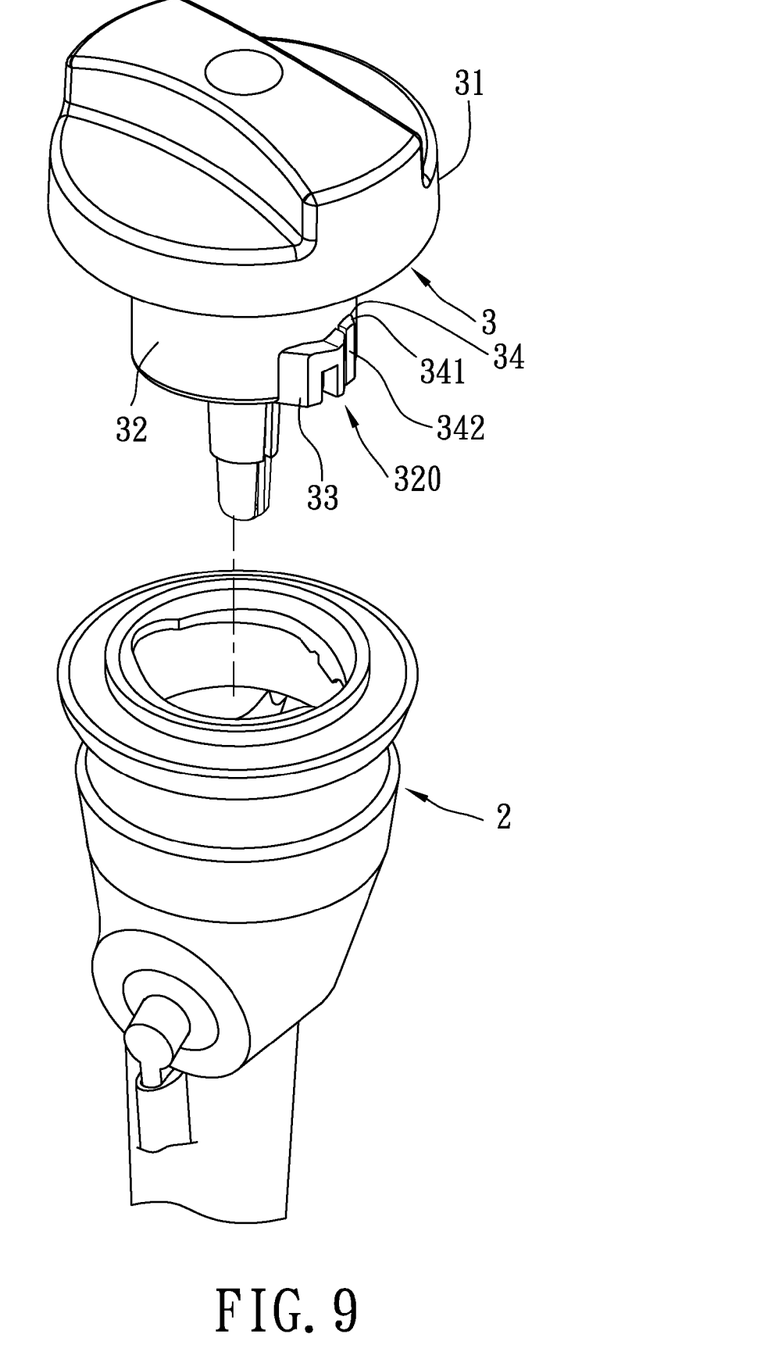
FIG. 9 is an exploded perspective view showing the second preferred embodiment of a fuel inlet device according to the present invention.
Figure 10:
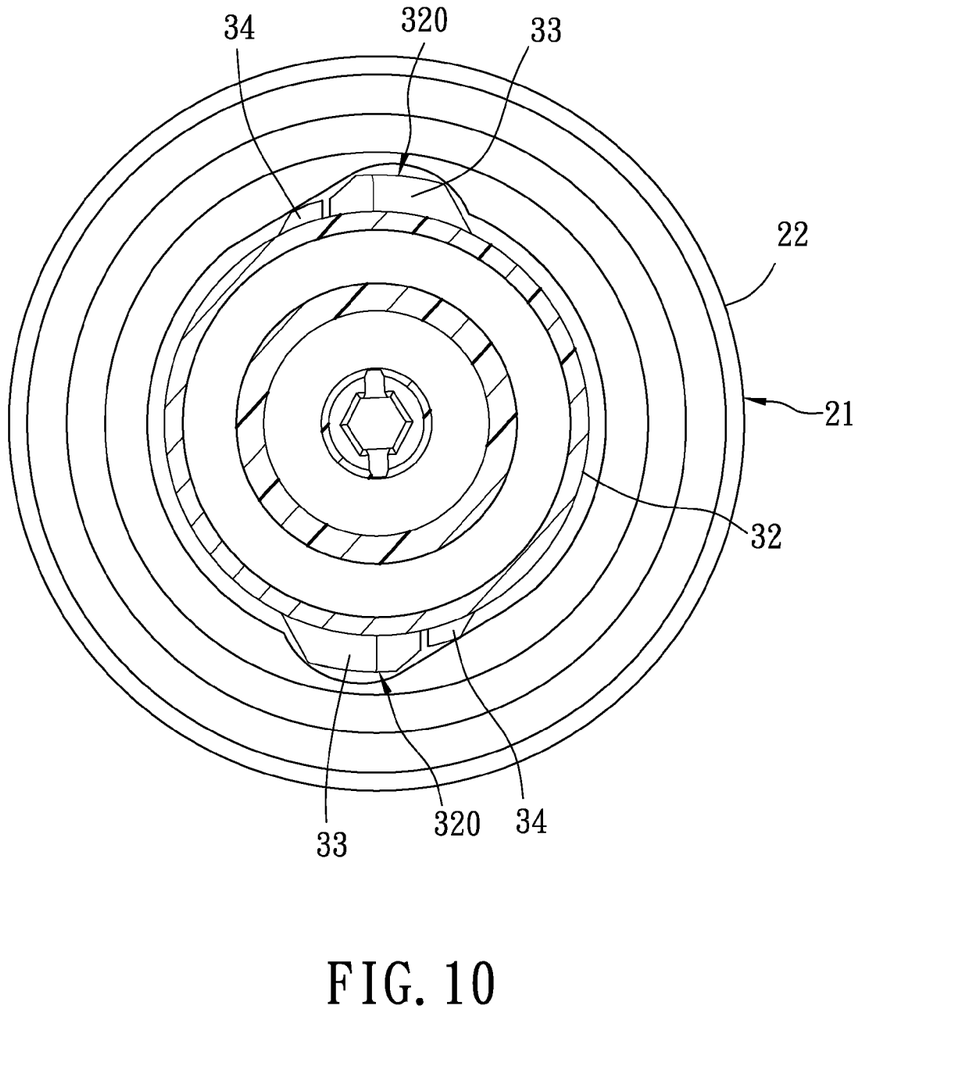
FIG. 10 is a schematic sectional top view showing the second preferred embodiment when a cap member is at an open position.

FIGS. 9 and 10 illustrate the second preferred embodiment of a fuel inlet device for a fuel tank according to this invention, which is a modification of the first preferred embodiment. Unlike the first preferred embodiment, the first and second abutting blocks 33, 34 of each of the protrusion units 320 of the cap member 3 are close to and spaced apart from each other in a circumferential direction of the plug body 32.

To sum up, due to the engagement between the engaging groove 332 in the first abutting block 33 of each of the protrusion units 320 and the engaging protrusion 2252 of the corresponding one of the abutting wall sections 252 of the inner annular wall 25 of the tube body 21, the cap member 3 can be effectively retained at the closed position without the unintentional movement of the cap member 3 away from the closed position encountered in the prior art, thereby ensuring tight connection between the cap member 3 and the fuel inlet port 2. Moreover, when the cap member 3 is rotated in a second direction (D) to move from the closed position to the open position, due to the end portions 261, the cap member 3 is effectively positioned at the open position, so that it is convenient to detach the cap member 3 from the fuel inlet port 2.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A fuel inlet device for a fuel tank, comprising:
a fuel inlet port adapted to be attached to the fuel tank through a fuel tube, and including a tube body that defines therein a fuel-filling channel in spatial communication with the fuel tube, said tube body having an upper cap-mounting end and a lower connecting end that is adapted to be connected to the fuel tube, said upper cap-mounting end of said tube body being formed with a central opening in spatial communication with said fuel-filling channel and defined by an inner annular wall, said inner annular wall having a depression section and being formed with at least one notch that is in communication with said central opening and said fuel-filling channel and that is defined by said depression section, said inner annular wall further having an abutting wall section disposed adjacent to said notch, said depression section having an end portion that extends downward into said fuel-filling channel and that is distal from said abutting wall section of said inner annular wall; and
a cap member adapted to be connected detachably to said fuel inlet port to seal said fuel-filling channel in said tube body of said fuel inlet port, said cap member including a plug body extending in a longitudinal direction and capable of being inserted into said fuel-filling channel in said tube body of said fuel inlet port through said central opening in said upper cap-mounting end of said tube body of said fuel inlet port, and at least one protrusion unit projecting outwardly and radially from said plug body such that said notch in said upper cap-mounting end of said tube body of said fuel inlet port permits said protrusion unit to pass therethrough so as to enter said fuel-filling channel in said tube body when said plug body of said cap member is inserted into said fuel-filling channel in said tube body, said protrusion unit having a first abutting block and a second abutting block;

wherein said first abutting block of said protrusion unit has an abutting top face, is greater than said second abutting block of said protrusion unit in a radial direction, and is less than said second abutting block of said protrusion unit in the longitudinal direction;

wherein, when said plug body and said protrusion unit of said cap member are inserted into said fuel-filling channel in said tube body of said fuel inlet port, said cap member is rotatable relative to said tube body of said fuel inlet port between an open position, where said cap member is capable of being detached from said fuel inlet port, and a closed position, where said cap member is tightly connected with said fuel inlet port;

wherein, when said cap member is at the open position, said second abutting block of said protrusion unit abuts against said end portion of said depression section of said inner annular wall of said tube body;

wherein, when said cap member is moved from the open position to the closed position, said abutting top face of said first abutting block of said protrusion unit abuts movably against a bottom end of said abutting wall section of said inner annular wall of said tube body; and wherein said second abutting block of said protrusion unit has an abutting face, which faces said abutting wall section of said inner annular wall of said tube body when said cap member is moved away from the open position and which abuts against said end portion of said depression section of said inner annular wall of said tube body when said cap member is at the open position.

2. The fuel inlet device as claimed in claim 1, wherein:
said inner annular wall of said tube body of said fuel inlet port is formed with two of said notches opposite to each other in a radial direction of said tube body, and has two of said abutting wall sections each disposed adjacent to a corresponding one of said notches; and
said cap member has two of said protrusion units corresponding respectively to said notches in said upper cap-mounting end of said tube body.

3. The fuel inlet device as claimed in claim 1, wherein said first and second abutting blocks of said protrusion unit of said cap member are integrally connected to each other.

4. The fuel inlet device as claimed in claim 1, wherein said first and second abutting blocks of said protrusion unit of said cap member are close to and spaced apart from each other in a circumferential direction of said plug body of said cap member.

5. The fuel inlet device as claimed in claim 1, wherein:
said inner annular wall of said tube body of said fuel inlet port further has a stop wall section extending downward into said fuel-filling channel, connected to said abutting wall section and distal from said notch; and
said first abutting block of said protrusion unit of said cap member has a lateral side distal from said second abutting block of said protrusion unit, and abutting against said stop wall section of said inner annular wall of said tube body when said cap member is at the closed position.

6. The fuel inlet device as claimed in claim 5, wherein:
said bottom end of said abutting wall section of said inner annular wall of said tube body has an inclined abutting edge extending downward and gradually toward said stop wall section, and a downward extending engaging protrusion disposed between said inclined abutting edge and said stop wall section; and
said first abutting block of said protrusion unit of said cap member has an abutting top face that abuts movably and forcedly against said inclined abutting edge of said bottom end of said abutting wall section of said inner annular wall of said tube body when said cap member is moved from the open position toward the closed position, and that is formed with an engaging groove engaging said engaging protrusion of said abutting wall section of said inner annular wall of said tube body when said cap member is moved to the closed position, thereby retaining said cap member at the closed position.

7. A cap member for a fuel inlet port attached to a fuel tank, the fuel inlet port including a tube body that defines a fuel-filling channel therein and that has an upper cap-mounting end and a lower connecting end connected to the fuel tank, the upper cap-mounting end of the tube body being formed with a central opening in spatial communication with the fuel-filling channel and defined by an inner annular wall, the inner annular wall having a depression section and being formed with at least one notch in communication with the central opening and the fuel-filling channel and defined by the depression section, the inner annular wall further having an abutting wall section disposed adjacent to the notch, the depression section having an end portion that extends downward into the fuel-filling channel and that is distal from the abutting wall section of the inner annular wall, said cap member being adapted to be connected detachably to the fuel inlet port to seal the fuel-filling channel in the tube body of the fuel inlet port, said cap member comprising:

a plug body extending in a longitudinal direction and adapted to be inserted into the fuel-filling channel in the tube body; and at least one protrusion unit projecting outwardly and radially from said plug body and configured to pass through the notch in the upper cap-mounting end of the tube body of the fuel inlet port so as to enter the fuel-filling channel in the tube body when said plug body is inserted into the fuel-filling channel in the tube body, said protrusion unit having a first abutting block and a second abutting block;

wherein said first abutting block of said protrusion unit is greater than said second abutting block of said protrusion in a radial direction and has an abutting top face, and said second abutting block of said protrusion unit is greater than said first abutting block of said protrusion unit in the longitudinal direction;

wherein, when said plug body and said protrusion unit of said cap member are inserted into the fuel-filling channel in the tube body of said fuel inlet port, said cap member is rotatable relative to the tube body of the fuel inlet port between an open position, where said cap member is capable of being detached from the fuel inlet port, and a closed position, where said cap member is tightly connected with the fuel inlet port;

wherein, when said cap member is at the open position, said second abutting block of said protrusion unit is adapted to abut against the end portion of the depression section of the inner annular wall of the tube body;

wherein, when said cap member is moved from the open position to the closed position, said abutting top face of said first abutting block of said protrusion unit is adapted to abut movably against a bottom end of the abutting wall section of the inner annular wall of the tube body; and wherein said second abutting block of said protrusion unit has an abutting face, which is adapted to face the abutting wall section of the inner annular wall of the tube body when said cap member is moved away from the open position and which is adapted to abut against the end portion of the depression section of the inner annular wall of the tube body when said cap member is at the open position.

8. The cap member as claimed in claim 7, the inner annular wall of the tube body of the fuel inlet port being formed with two of the notches opposite to each other in a radial direction of the tube body and having two of the abutting wall sections each disposed adjacent to a corresponding one of the notches,
wherein said cap member comprises two of said protrusion units adapted to correspond respectively to the notches in the tube body.

9. The cap member as claimed in claim 7, wherein said first and second abutting blocks of said protrusion unit are integrally connected to each other.

10. The cap member as claimed in claim 7, wherein said first and second abutting blocks of said protrusion unit are close to and spaced apart from each other in a circumferential direction of said plug body.

11. The cap member as claimed in claim 7, the bottom end of the abutting wall section of the inner annular wall of the tube body being formed with a downward extending engaging protrusion,
wherein said first abutting block of said protrusion unit has an abutting top face that abuts movably and forcedly against the bottom end of the abutting wall section of the inner annular wall of the tube body when said cap member is moved from the open position toward the closed position, and that is formed with an engaging groove, which is adapted to engage the engaging protrusion of the abutting wall section of the inner annular wall of the tube body when said cap member is moved to the closed position, thereby retaining said cap member at the closed position.

* * * * *